US012694597B2

(12) United States Patent
Li et al.

(10) Patent No.: US 12,694,597 B2
(45) Date of Patent: Jul. 28, 2026

(54) DYNAMIC FLUID DISPLAY METHOD AND APPARATUS, ELECTRONIC DEVICE, AND READABLE MEDIUM

(71) Applicant: Beijing Zitiao Network Technology Co., Ltd., Beijing (CN)

(72) Inventors: Qi Li, Beijing (CN); Xiaoqi Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 299 days.

(21) Appl. No.: 18/269,143

(22) PCT Filed: Nov. 25, 2021

(86) PCT No.: PCT/CN2021/133203
§ 371 (c)(1),
(2) Date: Jun. 22, 2023

(87) PCT Pub. No.: WO2022/135022
PCT Pub. Date: Jun. 30, 2022

(65) Prior Publication Data
US 2024/0087202 A1 Mar. 14, 2024

(30) Foreign Application Priority Data
Dec. 25, 2020 (CN) .......................... 202011565597.6

(51) Int. Cl.
*G06T 1/20* (2006.01)
*G06T 11/00* (2026.01)
(Continued)

(52) U.S. Cl.
CPC .............. *G06T 13/60* (2013.01); *G06T 11/10* (2026.01); *G06T 2210/24* (2013.01)

(58) Field of Classification Search
CPC ... G06T 13/60; G06T 11/001; G06T 2210/24; G06T 1/20; G06T 11/00; G06T 13/80
See application file for complete search history.

(56) References Cited

U.S. PATENT DOCUMENTS 10,499,883 B2 * 12/2019 Berger ..................... A61B 8/06
2006/0087509 A1 4/2006 Ebert et al.
(Continued)

FOREIGN PATENT DOCUMENTS

CN 103366045 A 10/2013
CN 105260014 A 1/2016
(Continued)

OTHER PUBLICATIONS

International Search Report issued Feb. 22, 2022, in International (PCT) Application No. PCT/CN2021/133203, with English translation (5 pages).
(Continued)

*Primary Examiner* — Xiao M Wu
*Assistant Examiner* — George Renze
(74) *Attorney, Agent, or Firm* — Astute IP Law Group

(57) ABSTRACT

Provided are a dynamic fluid display method and apparatus, an electronic device, and a readable medium. The method includes: displaying a fluid on a user display interface; obtaining a color corresponding to each texture pixel that corresponds to the fluid; in response to a processing instruction for the fluid, determining each target texture pixel corresponding to the processing instruction; and adjusting a color of the fluid at each target texture pixel based on the processing instruction.

16 Claims, 2 Drawing Sheets

Displaying a fluid on a user display interface — S101

Obtaining a color corresponding to each texture pixel that corresponds to the fluid — S102

In response to a processing instruction for the fluid, determining each target texture pixel corresponding to the processing instruction — S103

Adjusting a color of the fluid at each target texture pixel based on the processing instruction — S104

(51) Int. Cl.
*G06T 11/10* (2026.01)
*G06T 13/60* (2011.01)
*G06T 13/80* (2011.01)

(56) References Cited

U.S. PATENT DOCUMENTS

| | | | | |
|---|---|---|---|---|
| 2008/0170079 | A1 | 7/2008 | Ramshaw | |
| 2009/0041342 | A1* | 2/2009 | Chen | G06T 11/001 |
| | | | | 382/162 |
| 2013/0132053 | A1* | 5/2013 | Mech | G06T 11/001 |
| | | | | 703/9 |
| 2015/0161810 | A1* | 6/2015 | Macklin | G06T 13/60 |
| | | | | 345/474 |
| 2016/0247297 | A1 | 8/2016 | Deguy et al. | |
| 2017/0177759 | A1* | 6/2017 | Kim | G06F 17/11 |
| 2018/0012392 | A1* | 1/2018 | Kryachko | G06T 15/005 |
| 2019/0108299 | A1* | 4/2019 | Suwa | G06T 15/08 |
| 2020/0121175 | A1 | 4/2020 | Morita | |
| 2021/0390749 | A1* | 12/2021 | Stomakhin | G06T 13/40 |

FOREIGN PATENT DOCUMENTS

| | | | | |
|---|---|---|---|---|
| CN | 106997601 A | | 8/2017 | |
| CN | 108523931 A | | 9/2018 | |
| CN | 111402373 A | * | 7/2020 | G06T 11/001 |

OTHER PUBLICATIONS

Office Action for Chinese Patent Application No. 202011565597.6, mailed on Mar. 1, 2025, 16 pages.

* cited by examiner

DYNAMIC FLUID DISPLAY METHOD AND APPARATUS, ELECTRONIC DEVICE, AND READABLE MEDIUM

CROSS-REFERENCE TO RELATED APPLICATION

This is a national stage application filed under 37 U.S.C. 371 of International Patent Application No. PCT/CN2021/133203, filed Nov. 25, 2021, which claims priority to Chinese Patent Application No. 202011565597.6, titled "DYNAMIC FLUID DISPLAY METHOD AND APPARATUS, ELECTRONIC DEVICE, AND READABLE MEDIUM", and filed on Dec. 25, 2020, the disclosures of which are incorporated herein by reference in their entireties.

FIELD

The present disclosure relates to the field of computer technologies, and in particular, to a dynamic fluid display method and apparatus, an electronic device, and a readable medium.

BACKGROUND

Computer Graphics (CG) is the science of converting two- or three-dimensional graphics into a grid form of a computer display using mathematical algorithms. Simply put, computer graphics focuses on representations of graphics in computers, and principles and algorithms related to computation, processing, and display of graphics using computers.

Fluid simulation based on physical animation is an important area of research in computer graphics. With the development of mobile communication and computer technology, mobile terminals have been widely used. However, a fluid simulation method in the related art requires a very large amount of computation. When applied to a mobile terminal, the method in the related art is slow in the computation speed and cannot meet a requirement of real-time performance due to the very limited computation and storage resources on the mobile terminal.

SUMMARY

The present disclosure provides a dynamic fluid display method and apparatus, an electronic device, and a readable medium.

In a first aspect, a dynamic fluid display method is provided. The method includes: displaying a fluid on a user display interface; obtaining a color corresponding to each texture pixel that corresponds to the fluid; in response to a processing instruction for the fluid, determining each target texture pixel corresponding to the processing instruction; and adjusting a color of the fluid at each target texture pixel based on the processing instruction.

In a second aspect, the present disclosure provides an electronic device. The electronic device includes: one or more processors; and a memory having one or more applications stored thereon. The one or more applications, when executed by the one or more processors, cause the electronic device to perform operations corresponding to the dynamic fluid display method as described in the first aspect of the present disclosure.

In a third aspect, the present disclosure provides a non-transitory computer-readable medium configured to store computer instructions. The computer instructions, when executed by a computer, cause the computer to perform the dynamic fluid display method as described in the first aspect of the present disclosure.

BRIEF DESCRIPTION OF THE DRAWINGS

In order to clearly explain technical solutions of embodiments of the present disclosure, accompanying drawings used in description of the embodiments of the present disclosure will be briefly described below.

DETAILED DESCRIPTION

Figure 1:
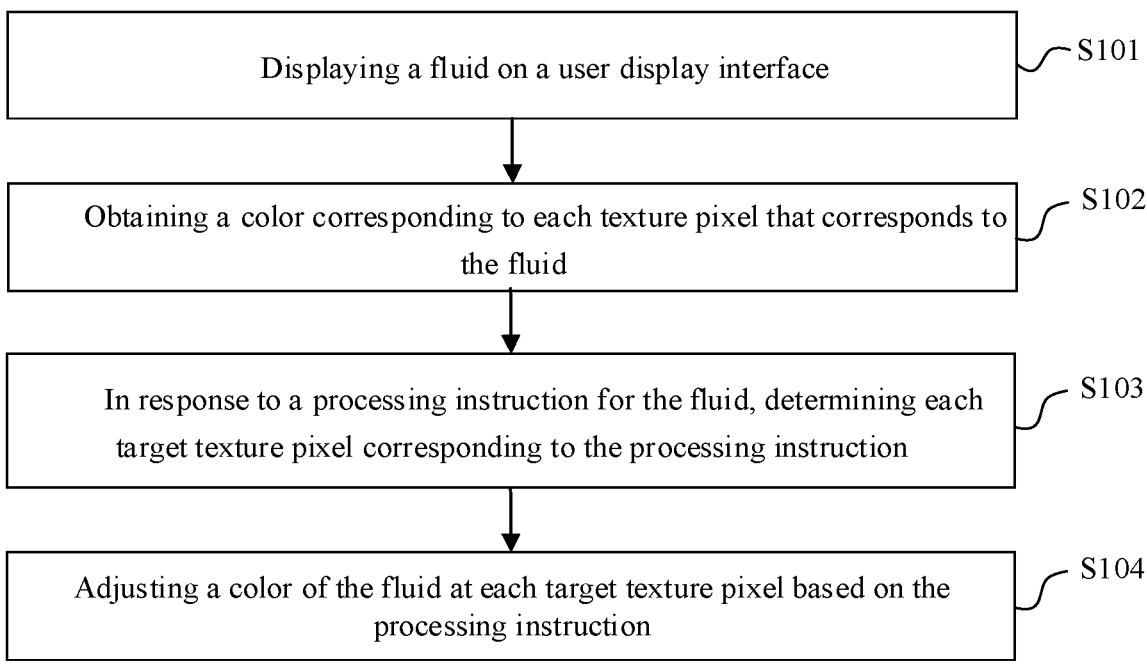
FIG. 1 is a flowchart illustrating a dynamic fluid display method according to an embodiment of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as being limited to the embodiments set forth herein. On the contrary, these embodiments are provided to facilitate a more thorough and complete understanding of the present disclosure. It should be understood that the accompanying drawings and embodiments of the present disclosure are only used for exemplary purposes, rather than to limit the protection scope of the present disclosure.

It should be understood that steps described in the method implementations of the present disclosure may be executed in different sequences and/or in parallel. In addition, method implementations may include additional steps and/or omit executions of the illustrated steps. The scope of the present disclosure is not limited in this respect.

The term "include" and its variants as used herein indicate open-ended inclusions, i.e., "includes but not limited to". The term "based on" refers to "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish apparatuses, modules or units, and are neither used to limit that these apparatuses, modules or units are definitely different apparatuses, modules or units, nor used to limit a sequence or interdependence of functions performed by these apparatuses, modules or units.

It should be noted that modifications such as "a" and "plurality of" mentioned in the present disclosure are schematic instead of restrictive, and should be construed as "one or more" by those skilled in the art, unless otherwise clearly indicated in the context.

Names of messages or information exchanged between apparatuses in the embodiments of the present disclosure are only used for illustrative purposes, and are not intended to limit the scope of these messages or information.

The technical solutions of the present disclosure and how the technical solutions of the present disclosure solve the above technical problems will be described in detail below with specific embodiments. The following several specific embodiments may be combined with each other, and the same or similar concepts or processes may not be repeated in some embodiments. The embodiments of the present disclosure will be described below with reference to the accompanying drawings.

The technical solutions of the present disclosure can be used in application programs involving creation, application, and use of dynamic fluid effects. The technical solutions of the present disclosure may be applied in a terminal device that may include a mobile terminal or a computer device. The mobile terminal may include, for example, a smartphone, a Personal Digital Assistant (PDA), a tablet computer, a wearable device having a display screen, a smart home device, etc. The computer device may include, for example, a desktop computer, a laptop computer, an all-in-one computer, etc.

In the technical solutions of the present disclosure, a fluid simulation rendering is displayed on a user display interface. A dynamic effect of a fluid may be displayed in a form of a video or a motion image. The technical solutions of the present disclosure can be implemented by means of a GPU in the terminal device.

FIG. 1 is a flowchart illustrating a dynamic fluid display method according to an embodiment of the present disclosure. As illustrated in FIG. 1, the method may include operations at block S101 to block S104.

At block S101, a fluid is displayed on a user display interface.

The user display interface may be a display interface in an application. The solution provided by the embodiments of the present disclosure may, for example, be implemented as an application or a functional plug-in of the application. When the terminal device detects a launch instruction of a user for the application, the application is launched and the user display interface is displayed. Or, when the terminal device detects a trigger instruction (e.g., a click on a virtual button) of the user for the functional plug-in of the application, the user display interface is displayed. A fluid image obtained by simulating a dynamic fluid is displayed on the user display interface.

At block S102, a color corresponding to each texture pixel that corresponds to the fluid is obtained.

The terminal device may pre-divide the user display interface into a plurality of grid elements in a horizontal direction and a vertical direction. The horizontal direction corresponds to a width direction of the user display interface. The vertical direction corresponds to a height direction of the user display interface. Each grid element corresponds to a position of each texture pixel of the GPU in a one-to-one correspondence. In a two-dimensional plane, the texture pixel corresponds to a position of a screen display pixel of the terminal device (that is, a display pixel in the user display interface) in a one-to-one correspondence. The texture pixel may be used to store a parameter of the fluid corresponding to each grid element, including an initial speed parameter, a pressure parameter, etc.

Optionally, the initial speed parameter may be stored in an RG channel of a corresponding texture pixel. A speed in an X direction is stored in an R channel. A speed in a Y direction is stored in a G channel.

Optionally, the pressure parameter is stored in the R channel of the corresponding texture pixel.

A color of the fluid displayed on the user display interface may be at least one pre-configured color, or may be at least one color determined based on a selection instruction of the user. The color corresponding to each texture pixel that corresponds to the fluid is a color of the fluid at each texture pixel.

At block S103, in response to a processing instruction for the fluid, each target texture pixel corresponding to the processing instruction is determined.

When the terminal device detects the processing instruction for the fluid, each target texture pixel at a position corresponding to the processing instruction is determined.

Optionally, the processing instruction may be an instruction determined by the terminal device based on a predetermined condition. The instruction corresponds to each grid element at a predetermined position, i.e., each texture pixel at a predetermined position. Each texture pixel at the predetermined position may be determined as the target texture pixel at a position corresponding to the processing instruction.

Optionally, the processing instruction may further be the trigger instruction entered by the user via the user display interface. The trigger instruction may be triggered continuously or intermittently. Each texture pixel at a trigger position in the user display interface on which the trigger instruction is applied may be determined as the target texture pixel.

At block S104, a color of the fluid at each target texture pixel is adjusted based on the processing instruction.

A fluid is displayed on the user display interface. A target texture pixel corresponding to the processing instruction is a target texture pixel corresponding to the fluid. The terminal device may adjust the color of the fluid at the target texture pixel corresponding to the processing instruction.

A color corresponding to the processing instruction may be a predetermined color, or may be a color determined based on the selection instruction of the user.

When the color corresponding to the processing instruction is different from the color of the fluid, a color change effect of the fluid may be presented on the user display interface, subsequent to adjusting the color of the fluid based on the processing instruction.

When the color corresponding to the processing instruction is the same as the color of the fluid, the color of the fluid displayed on the user display interface shows no change, subsequent to adjusting the color of the fluid based on the processing instruction.

In a possible implementation, adjusting the color of the fluid at each target texture pixel based on the processing instruction includes: determining a speed of the fluid at each target texture pixel based on the processing instruction; and adjusting, based on the speed of the fluid at each target texture pixel, the color of the fluid at the target texture pixel.

In practice, the processing instruction may correspond to an external force acting on the fluid at the target texture pixel. The external force produces an acceleration on the fluid, and changes the speed, including a magnitude and direction of the speed, of the fluid on a basis of an original initial speed of the fluid. A moving direction and a moving distance of the fluid at the target texture pixel may be determined based on the speed of the fluid. When the color corresponding to the processing instruction is different from the color of the fluid, the color of the fluid corresponding to each target texture pixel changes while the fluid is moving. A dynamic fluid with a color change is presented on the user display interface. When the color corresponding to the processing instruction is the same as the color of the fluid, the color of the fluid corresponding to each target texture pixel is adjusted while the fluid is moving, but the color presented shows no change. The dynamic fluid is presented on the user display interface.

In a possible implementation, the method further includes: obtaining a time stepsize for updating the speed; determining a first texture pixel position at a current time point based on the time stepsize, a speed corresponding to the fluid at the target texture pixel at the current time point, and a position of the target texture pixel at the current time point; and determining a color at the first texture pixel position at the current time point as a color of the fluid at the target texture pixel at a next time point.

In practice, the time stepsize for updating the speed is pre-configured. The speed of the fluid at each target texture pixel is updated based on the time stepsize. The color of the fluid at each target texture pixel is updated simultaneously as the speed is updated.

In an example, the color of the fluid at each target texture pixel is updated in accordance with an equation (1):

$$I_x^{t+1} = I_{x-dt*v_x^t}^t \qquad (1)$$

where x represents a position of a grid element corresponding to the target texture pixel;

$$I_x^{t+1}$$

represents a color of the fluid at a position x at a time point t+1; dt represents the time stepsize;

$$v_x^t$$

represents a speed of the fluid at the position x at a time point t;

$$x - dt*v_x^t$$

represents the first texture pixel position at the time point t; and $$I_{x-dt*v_x^t}^*$$

represents a color of the fluid at the first texture pixel position at the time point t.

In a possible implementation, the method further includes: determining the speed of the fluid at each target texture pixel in conjunction with an effect of gravity and based on the processing instruction.

In practice, the effect of gravity may be added to the fluid subsequent to an application of the processing instruction on the fluid, to determine the speed of the fluid at each target texture pixel under a combined effect of the processing instruction and gravity.

In an example, the speed of the fluid at each target texture pixel is updated in accordance with an equation (2):

$$v^{t+1} = t^t + g*dt \qquad (2)$$

where $v^{t+1}$ represents a speed of the fluid under the effect of gravity at each target texture pixel at the time point t+1; $v^t$ represents a speed of the fluid under an effect of the processing instruction at each target texture pixel at the time point t; g represents a gravitational acceleration; and dt represents the time stepsize.

In a possible implementation, the method further includes: determining, based on the speed of the fluid at each target texture pixel, a curl of the speed of the fluid at the target texture pixel; and updating, based on the curl of the speed of the fluid at each target texture pixel, the speed of the fluid at the target texture pixel to a first speed.

In practice, to add a turbulence effect to the fluid, a curl may be added to the speed of the fluid. The speed is updated based on the curl. The curl represents a degree of rotation caused by a vector field to an infinitesimal element adjacent to a point. The first speed is a speed updated based on the curl, also known as an active speed. The fluid at each target texture pixel has its own corresponding active speed, which forms an active speed field.

In an example, the curl of the speed of the fluid at each target texture pixel is calculated in accordance with an equation (3):

$$W = \nabla \times v = \frac{\partial v_y}{\partial x} - \frac{\partial v_x}{\partial y} \qquad (3)$$

where w represents the curl of the speed of the fluid at each target texture pixel; v represents the speed of the fluid at each target texture pixel; $\nabla \times v$ represents the curl of the speed; $v_x$ represents a component of the speed in an x direction; and $v_y$ represents a component of the speed in a y direction.

The speed of the fluid is updated, based on the curl of the speed of the fluid at each target texture pixel, to the first speed in accordance with an equation (4):

$$v^{t+1} = v^t + f_{vc}*dt \qquad (4)$$

$$f_{vc} = \varepsilon(\varphi \times w) \qquad (5)$$

$$\eta = \nabla|w| \qquad (6)$$

$$\varphi = \frac{\eta}{|\eta|} \qquad (7)$$

where $v^{t+1}$ represents the speed of the fluid at each target texture pixel at the time point t+1 subsequent to an update based on the curl; $v^t$ represents the speed of the fluid at each target texture pixel at the time point t; $f_{vc}$ represents an external force exerted on the fluid at each target texture pixel by an action of the curl; dt represents the time stepsize; $\varepsilon$ represents a predetermined value, which may be preconfigured as specifically needed; w represents the curl of the speed of the fluid at each target texture pixel; $\eta$ and $\varphi$ are intermediate values, which can be obtained from a calculation of w, and $\nabla$ represents a gradient.

In a possible implementation, the method further includes: determining, based on the speed of the fluid at each target texture pixel, a divergence of the speed of the fluid at the target texture pixel; determining a pressure of the fluid at the target texture pixel based on the divergence of the speed of the fluid at the target texture pixel and a pressure of the fluid at each adjacent target texture pixel to the target texture pixel; and updating the speed of the fluid at the target texture pixel based on the pressure of the fluid at the target texture pixel and the first speed.

In practice, the fluid is normally considered incompressible, i.e., of a constant density. In terms of mathematical expression, this means that a divergence of a speed field of the fluid is 0. With an addition of the effects of gravity and turbulence, the speed field of the fluid fails to satisfy a passive condition, i.e., the constant density. Thus, it is necessary to project the speed field back to a passive speed field. In some embodiments, the divergence of the speed of the fluid at each target texture pixel is calculated. The pressure of the fluid at the target texture pixel is determined based on the divergence of the speed of the fluid at the target texture pixel and the pressure of the fluid at each adjacent target texture pixel to the target texture pixel. The speed of the fluid at the target texture pixel is updated based on the pressure of the fluid at the target texture pixel and the first speed. The updated speed satisfies the passive condition, which ensures the constant density. In this way, the fluid displayed on the user display interface will not be compressed due to movements.

In an example, the divergence of the speed of the fluid at each target texture pixel is calculated in accordance with an equation (8):

$$b = \nabla \cdot v = \frac{\partial v_x}{\partial x} + \frac{\partial v_y}{\partial y} \tag{8}$$

where v represents the speed of the fluid at each target texture pixel; b represents the divergence of the fluid at each target texture pixel; $\nabla \cdot v$ represents a divergence of a speed v; $v_x$ represents the component of the speed in the x direction; and $v_y$ represents the component of the speed in the y direction.

The pressure of the fluid at each target texture pixel can be calculated in accordance with an equation (9):

$$p_{i,j}^{k+1} = \frac{P_{i-1,j}^k + p_{i+1,j}^k + p_{i,j-1}^k + p_{i,j+1}^k - (\delta x)^2 b_{i,j}^t}{4} \tag{9}$$

where $$p_{i,j}^{ki1}$$

represents a fluid pressure at a (k+1)-th iteration at a target texture pixel corresponding to a grid element (i, j), δx represents an edge length of one grid element, $$b_{i,j}^t$$

represents a divergence of a speed of the fluid at a k-th iteration at the target texture pixel corresponding to the grid element (i, j);

$$p_{i,j}^k$$

represents a fluid pressure at the k-th iteration at the target texture pixel corresponding to a grid element (i–1, j);

$$p_{i+1,j}^k$$

represents a fluid pressure at the k-th iteration at a texture pixel corresponding to a grid element (i+1, j);

$$p_{i,j-1}^k$$

represents a fluid pressure at the k-th iteration at a texture pixel corresponding to a grid element (i, j–1); and $$p_{i,j-1}^k$$

represents a fluid pressure at the k-th iteration at a texture pixel corresponding to a grid element (i, j+1).

In a possible implementation, updating the speed of the fluid at the target texture pixel based on the pressure of the fluid at the target texture pixel and the first speed includes: obtaining a gradient of the pressure of the fluid at the target texture pixel; obtaining a difference between the first speed and the gradient of the pressure, and determining the difference as a second speed of the fluid at the target texture pixel; and updating the second speed to obtain the speed of the fluid at the target texture pixel.

In practice, the first speed is the speed updated based on the curl, which is the active speed. The passive speed field is obtained by subtracting the gradient of the pressure of the fluid at the target texture pixel from the active speed. The speed of the fluid at each target texture pixel in the passive speed field is the passive speed. The second speed is a passive speed. By processing the active speed into the passive speed and using the passive speed for a speed update, the constant density during a fluid speed update can be ensured.

In a possible implementation, for each target texture pixel, updating the second speed to obtain the speed of the fluid at the target texture pixel includes: obtaining a time stepsize for updating the speed; determining a first texture pixel position at a current time point based on the time stepsize, a speed corresponding to the fluid at the target texture pixel at the current time point, and a position of the target texture pixel at the current time point; and determining a speed at the first texture pixel position at the current time point as a speed of the fluid at the target texture pixel at a next time point.

In practice, the speed of the fluid at each target texture pixel is continuously updated over time. The time stepsize for updating the speed may be pre-configured. The speed of the fluid at each target texture pixel is updated based on the time stepsize.

In an example, the speed of the fluid at each target texture pixel is updated in accordance with an equation (10):

$$V_x^{t+1} = V_{x-dt^*v_x^t}^t \tag{10}$$

where x represents the position of the grid element corresponding to the target texture pixel;

$$V_x^{t+1}$$

represents a speed of the fluid at a position x at the time point t+1; dt represents the time stepsize;

$$v_x^t$$

represents a speed of the fluid at the position x at the time point t;

$$x - dt^* v_x^t$$

represents the first texture pixel position at the time point t; and $$V_{x-dt^* v_x^t}^t$$

represents the speed of the fluid at the first texture pixel position at the time point t.

In a possible implementation, the method further includes storing, via a GPU, a speed and a pressure of the fluid at each texture pixel.

In practice, the speed and the pressure of the fluid at each texture pixel are stored via the GPU. When a processing instruction for the fluid in the user display interface is detected, the color of the fluid at each target texture pixel corresponding to the processing instruction is adjusted. By processing data through the GPU, frequent data communication between the GPU and a CPU is avoided, which can improve a speed of a data processing and achieve real-time display of a simulated dynamic fluid.

In a possible implementation, determining each target texture pixel corresponding to the processing instruction includes: determining each target texture pixel corresponding to the processing instruction based on a position or a movement trajectory of a target object.

In practice, the target object may be, for example, a gesture or other body (e.g., head) movements of the user. Each target texture pixel may be determined based on the position or the movement trajectory of the target object detected in the user display interface, to adjust the color of the fluid at each target texture pixel.

When the target object is stationary, each target texture pixel corresponding to the position of the target object is determined based on the position of the target object. When the target object is in motion, the movement trajectory of the target object is obtained. Positions corresponding to the movement trajectory are positions of individual target texture pixels.

In a possible implementation, the target object includes a touch operation object or a target object displayed in a video.

In practice, the target object may be the touch operation object. A touch operation is performed by directly touching the user display interface of the terminal device. A texture pixel corresponding to a position of the touch operation is determined as the target texture pixel. The target object may further be the target object displayed in the video. The user turns on a camera of the terminal device and performs video recording. The terminal device detects an object in the video, determines the object in the video as the target object, determines the position of the target texture pixel based on a position of the object in the video, and adjusts a color of the fluid at the target texture pixel.

In the dynamic fluid display method provided in the embodiments of the present disclosure, the fluid is displayed on the user display interface. The color corresponding to each texture pixel that corresponds to the fluid is obtained. In response to the processing instruction for the fluid, each target texture pixel corresponding to the processing instruction is determined. The color of the fluid at each target texture pixel is adjusted based on the processing instruction. With the technical solutions of the present disclosure, a color corresponding to each texture pixel of a GPU corresponding to the fluid is obtained, and the color of the fluid at each target texture pixel corresponding to the processing instruction is adjusted. By processing the data through the GPU, the frequent data communication between the GPU and the CPU is avoided, which can improve the speed of the data processing and achieve the real-time display of the simulated dynamic fluid.

Figure 2:
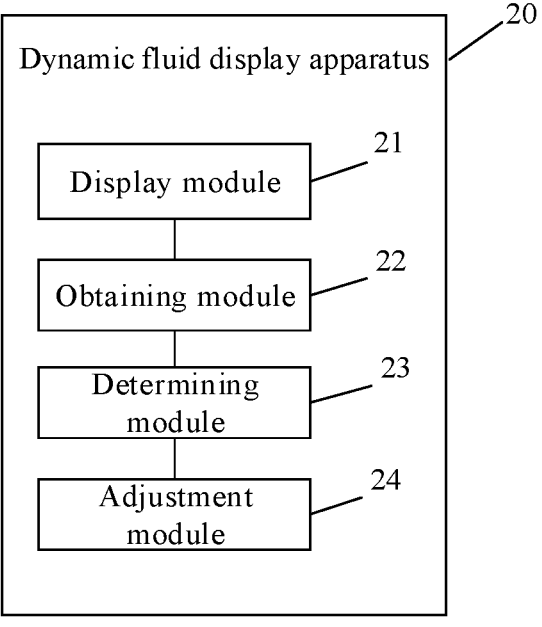
FIG. 2 is a schematic diagram showing a structure of a dynamic fluid display apparatus according to an embodiment of the present disclosure.

Based on the same principle as that of the method illustrated in FIG. 1, the embodiments of the present disclosure further provide a dynamic fluid display apparatus 20. As illustrated in FIG. 2, the dynamic fluid display apparatus 20 may include a display module 21, an obtaining module 22, a determining module 23, and an adjustment module 24.

The display module 21 is configured to display a fluid on a user display interface.

The obtaining module 22 is configured to obtain a color corresponding to each texture pixel that corresponds to the fluid.

The determining module 23 is configured to determine, in response to a processing instruction for the fluid, each target texture pixel corresponding to the processing instruction.

The adjustment module 24 is configured to adjust a color of the fluid at each target texture pixel based on the processing instruction.

In a possible implementation, the adjustment module 24 is specifically configured to: determine a speed of the fluid at each target texture pixel based on the processing instruction; and adjust, based on the speed of the fluid at each target texture pixel, the color of the fluid at the target texture pixel.

In a possible implementation, the apparatus 20 further includes a color update module. The color update module is configured to: obtain a time stepsize for updating the speed; determine a first texture pixel position at a current time point based on the time stepsize, a speed corresponding to the fluid at the target texture pixel at the current time point, and a position of the target texture pixel at the current time point; and determine a color at the first texture pixel position at the current time point as a color of the fluid at the target texture pixel at a next time point.

In a possible implementation, the apparatus 20 further includes a speed determining module. The speed determining module is configured to determine the speed of the fluid at each target texture pixel in conjunction with an effect of gravity and based on the processing instruction.

In a possible implementation, the apparatus 20 further includes a first speed update module. The first speed update module is configured to: determine, based on the speed of the fluid at each target texture pixel, a curl of the speed of the fluid at the target texture pixel; and update, based on the curl of the speed of the fluid at each target texture pixel, the speed of the fluid at the target texture pixel to a first speed.

In a possible implementation, the apparatus 20 further includes a second speed update module. The second speed update module is configured to: determine, based on the speed of the fluid at each target texture pixel, a divergence of the speed of the fluid at the target texture pixel; determine a pressure of the fluid at the target texture pixel based on the divergence of the speed of the fluid at the target texture pixel and a pressure of the fluid at each adjacent target texture pixel to the target texture pixel; and update the speed of the fluid at the target texture pixel based on the pressure of the fluid at the target texture pixel and the first speed.

In a possible implementation, the second speed update module is configured to, when updating the speed of the fluid at the target texture pixel based on the pressure of the fluid at the target texture pixel and the first speed: obtain a gradient of the pressure of the fluid at the target texture pixel; obtain a difference between the first speed and the gradient of the pressure, and determine the difference as a second speed of the fluid at the target texture pixel; and update the second speed to obtain the speed of the fluid at the target texture pixel.

In a possible implementation, for each target texture pixel, the second speed update module is configured to, when updating the second speed to obtain the speed of the fluid at the target texture pixel: obtain a time stepsize for updating the speed; determine a first texture pixel position at a current time point based on the time stepsize, a speed corresponding to the fluid at the target texture pixel at the current time point, and a position of the target texture pixel at the current time point; and determine a speed at the first texture pixel position at the current time point as a speed of the fluid at the target texture pixel at a next time point.

In a possible implementation, the apparatus 20 further includes a storage module. The storage module is configured to store, via a GPU, a speed and a pressure of the fluid at each texture pixel.

In a possible implementation, the determining module 23 is configured to determine each target texture pixel corresponding to the processing instruction based on a position or a movement trajectory of a target object.

In a possible implementation, the target object includes a touch operation object or a target object displayed in a video.

The dynamic fluid display apparatus of the embodiments of the present disclosure can perform the dynamic fluid display method provided in the embodiments of the present disclosure, principles of implementation of which are similar to those of the dynamic fluid display method. Actions performed by modules in the dynamic fluid display apparatus of the embodiments of the present disclosure correspond to the steps in the dynamic fluid display method of the embodiments of the present disclosure. A detailed function description of each module of the dynamic fluid display apparatus can be referred to corresponding description of the dynamic fluid display method described above, and details thereof will be omitted here.

With the dynamic fluid display apparatus provided in the embodiments of the present disclosure, the fluid is displayed on the user display interface. The color corresponding to each texture pixel that corresponds to the fluid is obtained. In response to the processing instruction for the fluid, each target texture pixel corresponding to the processing instruction is determined. The color of the fluid at each target texture pixel is adjusted based on the processing instruction. With the technical solutions of the present disclosure, a color corresponding to each texture pixel of a GPU corresponding to the fluid is obtained, and the color of the fluid at each target texture pixel corresponding to the processing instruction is adjusted. By processing the data through the GPU, the frequent data communication between the GPU and the CPU is avoided, which can improve the speed of the data processing and achieve the real-time display of the simulated dynamic fluid.

Figure 3:
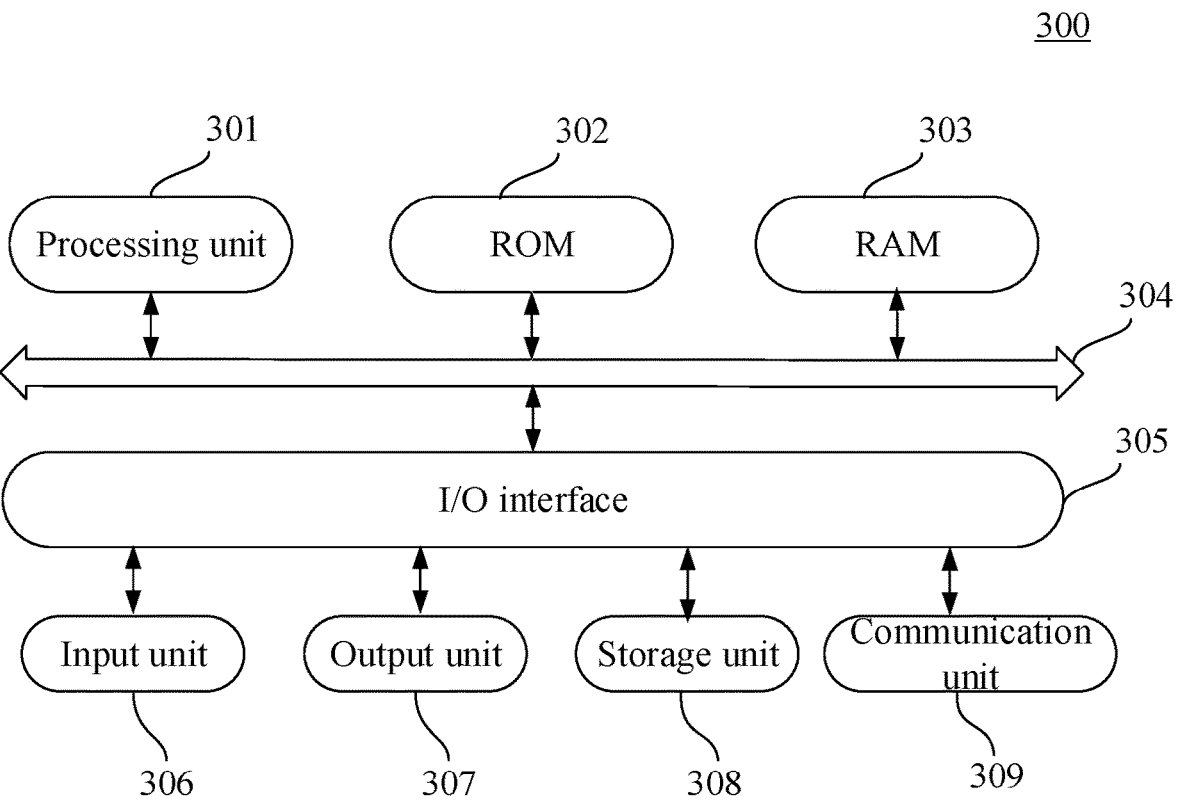
FIG. 3 is a schematic diagram showing a structure of an electronic device according to an embodiment of the present disclosure.

Reference is now made to FIG. 3, which is a schematic diagram showing a structure of an electronic device 300 adapted to implement the embodiments of the present disclosure. An executive subject of the technical solutions of the embodiments of the present disclosure may include, but are not limited to, mobile terminals such as a mobile phone, a laptop computer, a digital broadcast receiver, a PDA, a tablet computer or PAD, a Portable Multimedia Player (PMP), an on-vehicle terminal (e.g., an on-vehicle navigation terminal), a wearable device, etc., and fixed terminals such as a digital TV, a desktop computer, a smart home device, etc. The electronic device illustrated in FIG. 3 is exemplary only, and should not be construed as limiting the function and scope of use of the embodiments of the present disclosure.

The electronic device includes a memory and a processor. Here, the processor may be referred to as a processing unit 301 described below, and the memory may include at least one of a Read Only Memory (ROM) 302, a Random Access Memory (RAM) 303, or a storage unit 308 that are described below. Specific details are described below.

As illustrated in FIG. 3, the electronic device 300 may include a processing unit (such as a central processor, a graphics processor, etc.) 301, which may perform various appropriate actions and processes in accordance with programs stored in an ROM 302 or loaded from a storage unit 308 into an RAM 303, to implement the above functions as defined in the method of the embodiments of the present disclosure. In the RAM 303, various programs and data required for operation of the electronic device 300 may also be stored. The processing unit 301, the ROM 302, and the RAM 303 are connected to each other through a bus 304. An Input/Output (I/O) interface 305 is also connected to the bus 304.

Generally, the following units may be connected to the I/O interface 305: an input unit 306 including, for example, a touch screen, a touch pad, a keyboard, a mouse, a camera, a microphone, an accelerometer, a gyroscope, etc.; an output unit 307 including, for example, a Liquid Crystal Display (LCD), a speaker, an oscillator, etc.; the storage unit 308 including, for example, a magnetic tape or a hard disk; and a communication unit 309. The communication unit 309 may allow the electronic device 300 to perform wireless or wired communication with other devices for data exchange. Although FIG. 3 illustrates the electronic device 300 having various units, it can be appreciated that it is not necessary to implement or provide all the illustrated units. Alternatively, more or fewer units may be implemented or provided.

In particular, according to embodiments of the present disclosure, the processes described above with reference to the flowcharts may be implemented as computer software programs. For example, an embodiment of the present disclosure includes a computer program product, which includes a computer program carried on a non-transient computer-readable medium. The computer program includes program codes for implementing the method illustrated in any of the flowcharts. In these embodiments, the computer program may be downloaded and installed from a network through the communication unit 309, or installed from the storage unit 308, or installed from the ROM 302. When the computer program is executed by the processing unit 301, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but are not limited to: an electrical connection having one or more wires, a portable computer disk, a hard disk, an RAM, an ROM, an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier and carrying computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, and may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server can communicate using any currently-known or future-developed network protocol, such as HyperText Transfer Protocol (HTTP), and can be in interconnection communication with digital data in any form or medium (e.g., a communication network). Examples of communication networks include a Local Area Network (LAN), a Wide Area Network (WAN), the Internet work (e.g., the Internet), and an end-to-end network (e.g., ad hoc end-to-end network), as well as any currently-known or future-developed network.

The above computer-readable medium may be included in the above electronic device; or may be present independently without being assembled into the electronic device.

The above computer-readable medium may carry one or more programs which, when executed by the electronic device, causes the electronic device to perform the above functions as defined in the method of the embodiments of the present disclosure. For example, the one or more programs, when executed by the electronic device, cause the electronic device to: display a fluid on a user display interface; obtain a color corresponding to each texture pixel that corresponds to the fluid; in response to a processing instruction for the fluid, determine each target texture pixel corresponding to the processing instruction; and adjust a color of the fluid at each target texture pixel based on the processing instruction.

The computer program codes for implementing the operations according to the present disclosure may be written in one or more programming languages or any combination thereof. The programming languages may include but are not limited to object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on a remote computer or server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Modules or units involved and described in the embodiments of the present disclosure can be implemented in software or hardware. Here, a name of a module or a unit does not constitute a limitation on the module or the unit itself under certain circumstances.

The functions described above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

According to one or more embodiments of the present disclosure, the present disclosure provides a dynamic fluid display method. The method includes: displaying a fluid on a user display interface; obtaining a color corresponding to each texture pixel that corresponds to the fluid; in response to a processing instruction for the fluid, determining each target texture pixel corresponding to the processing instruction; and adjusting a color of the fluid at each target texture pixel based on the processing instruction.

In a possible implementation, adjusting the color of the fluid at each target texture pixel based on the processing instruction includes: determining a speed of the fluid at each target texture pixel based on the processing instruction; and adjusting, based on the speed of the fluid at each target texture pixel, the color of the fluid at the target texture pixel.

In a possible implementation, the method further includes: obtaining a time stepsize for updating the speed; determining a first texture pixel position at a current time point based on the time stepsize, a speed corresponding to the fluid at the target texture pixel at the current time point, and a position of the target texture pixel at the current time point; and determining a color at the first texture pixel position at the current time point as a color of the fluid at the target texture pixel at a next time point.

In a possible implementation, the method further includes: determining the speed of the fluid at each target texture pixel in conjunction with an effect of gravity and based on the processing instruction.

In a possible implementation, the method further includes: determining, based on the speed of the fluid at each target texture pixel, a curl of the speed of the fluid at the target texture pixel; and updating, based on the curl of the speed of the fluid at each target texture pixel, the speed of the fluid at the target texture pixel to a first speed.

In a possible implementation, the method further includes: determining, based on the speed of the fluid at each target texture pixel, a divergence of the speed of the fluid at the target texture pixel; determining a pressure of the fluid at the target texture pixel based on the divergence of the speed of the fluid at the target texture pixel and a pressure of the fluid at each adjacent target texture pixel to the target texture pixel; and updating the speed of the fluid at the target texture pixel based on the pressure of the fluid at the target texture pixel and the first speed.

In a possible implementation, updating the speed of the fluid at the target texture pixel based on the pressure of the fluid at the target texture pixel and the first speed includes: obtaining a gradient of the pressure of the fluid at the target texture pixel; obtaining a difference between the first speed and the gradient of the pressure, and determining the difference as a second speed of the fluid at the target texture pixel; and updating the second speed to obtain the speed of the fluid at the target texture pixel.

In a possible implementation, for each target texture pixel, updating the second speed to obtain the speed of the fluid at the target texture pixel includes: obtaining a time stepsize for updating the speed; determining a first texture pixel position at a current time point based on the time stepsize, a speed corresponding to the fluid at the target texture pixel at the current time point, and a position of the target texture pixel at the current time point; and determining a speed at the first texture pixel position at the current time point as a speed of the fluid at the target texture pixel at a next time point.

In a possible implementation, the method further includes storing, via a GPU, a speed and a pressure of the fluid at each texture pixel.

In a possible implementation, determining each target texture pixel corresponding to the processing instruction includes determining each target texture pixel corresponding to the processing instruction based on a position or a movement trajectory of a target object.

In a possible implementation, the target object includes a touch operation object or a target object displayed in a video.

According to one or more embodiments of the present disclosure, the present disclosure provides a dynamic fluid display apparatus. The apparatus includes: a display module configured to display a fluid on a user display interface; an obtaining module configured to obtain a color corresponding to each texture pixel that corresponds to the fluid; a determining module configured to determine, in response to a processing instruction for the fluid, each target texture pixel corresponding to the processing instruction; and an adjustment module configured to adjust a color of the fluid at each target texture pixel based on the processing instruction.

In a possible implementation, the adjustment module is configured to: determine a speed of the fluid at each target texture pixel based on the processing instruction; and adjust, based on the speed of the fluid at each target texture pixel, the color of the fluid at the target texture pixel.

In a possible implementation, the apparatus further includes a color update module. The color update module is configured to: obtain a time stepsize for updating the speed; determine a first texture pixel position at a current time point based on the time stepsize, a speed corresponding to the fluid at the target texture pixel at the current time point, and a position of the target texture pixel at the current time point; and determine a color at the first texture pixel position at the current time point as a color of the fluid at the target texture pixel at a next time point.

In a possible implementation, the apparatus further includes a speed determining module. The speed determining module is configured to determine the speed of the fluid at each target texture pixel in conjunction with an effect of gravity and based on the processing instruction.

In a possible implementation, the apparatus further includes a first speed update module. The first speed update module is configured to: determine, based on the speed of the fluid at each target texture pixel, a curl of the speed of the fluid at the target texture pixel; and update, based on the curl of the speed of the fluid at each target texture pixel, the speed of the fluid at the target texture pixel to a first speed.

In a possible implementation, the apparatus further includes a second speed update module. The second speed update module is configured to: determine, based on the speed of the fluid at each target texture pixel, a divergence of the speed of the fluid at the target texture pixel; determine a pressure of the fluid at the target texture pixel based on the divergence of the speed of the fluid at the target texture pixel and a pressure of the fluid at each adjacent target texture pixel to the target texture pixel; and update the speed of the fluid at the target texture pixel based on the pressure of the fluid at the target texture pixel and the first speed.

In a possible implementation, the second speed update module is configured to, when updating the speed of the fluid at the target texture pixel based on the pressure of the fluid at the target texture pixel and the first speed: obtain a gradient of the pressure of the fluid at the target texture pixel; obtain a difference between the first speed and the gradient of the pressure, and determine the difference as a second speed of the fluid at the target texture pixel; and update the second speed to obtain the speed of the fluid at the target texture pixel.

In a possible implementation, for each target texture pixel, the second speed update module is configured to, when updating the second speed to obtain the speed of the fluid at the target texture pixel: obtain a time stepsize for updating the speed; determine a first texture pixel position at a current time point based on the time stepsize, a speed corresponding to the fluid at the target texture pixel at the current time point, and a position of the target texture pixel at the current time point; and determine a speed at the first texture pixel position at the current time point as a speed of the fluid at the target texture pixel at a next time point.

In a possible implementation, the apparatus further includes a storage module. The storage module is configured to store, via a GPU, a speed and a pressure of the fluid at each texture pixel.

In a possible implementation, the determining module is specifically configured to determine each target texture pixel corresponding to the processing instruction based on a position or a movement trajectory of a target object.

In a possible implementation, the target object includes a touch operation object or a target object displayed in a video.

According to one or more embodiments of the present disclosure, the present disclosure provides an electronic device. The electronic device includes: one or more processors; and a memory having one or more applications stored thereon. The one or more applications, when executed by the one or more processors, cause the electronic device to perform the dynamic fluid display method.

According to one or more embodiments of the present disclosure, the present disclosure provides a computer-readable medium. The computer-readable medium is configured to store computer instructions. The computer instructions, when executed by a computer, cause the computer to perform the above-mentioned dynamic fluid display method.

According to one or more embodiments of the present disclosure, the present disclosure provides a computer program product. The computer program product includes computer instructions. The computer instructions, when executed by a computer, implement the above-mentioned dynamic fluid display method.

The above description is only intended to explain the preferred embodiments of the present disclosure and the employed principles of technology. It will be appreciated by those skilled in the art that the scope of the present disclosure herein is not limited to the technical solutions formed by the specific combinations of the above technical features, but should also encompass other technical solutions formed by any other combinations of features described above or equivalents thereof without departing from the above ideas of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of method, it should be understood that the subject matter defined in the appended claims is not necessarily limited to the specific features or actions described above. On the contrary, the specific features and actions described above are merely exemplary forms of implementing the claims.

What is claimed is:

1. A dynamic fluid display method, comprising:
displaying a fluid on a user display interface;
obtaining a color corresponding to each texture pixel that corresponds to the fluid;
determining, in response to a processing instruction for the fluid, each target texture pixel corresponding to the processing instruction; and
adjusting a color of the fluid at each target texture pixel based on the processing instruction,
wherein said adjusting the color of the fluid at each target texture pixel based on the processing instruction comprises:
determining a speed of the fluid at each target texture pixel based on the processing instruction; and
adjusting, based on the speed of the fluid at each target texture pixel, the color of the fluid at the target texture pixel,
wherein the method further comprises:
obtaining a time stepsize for updating the speed;
determining a first texture pixel position at a current time point based on the time stepsize, a speed corresponding to the fluid at the target texture pixel at the current time point, and a position of the target texture pixel at the current time point; and
determining a color at the first texture pixel position at the current time point as a color of the fluid at the target texture pixel at a next time point.

2. The dynamic fluid display method according to claim 1, further comprising:
determining the speed of the fluid at each target texture pixel in conjunction with an effect of gravity and based on the processing instruction.

3. The dynamic fluid display method according to claim 2, further comprising:
determining, based on the speed of the fluid at each target texture pixel, a curl of the speed of the fluid at the target texture pixel; and
updating, based on the curl of the speed of the fluid at each target texture pixel, the speed of the fluid at the target texture pixel to a first speed.

4. The dynamic fluid display method according to claim 3, further comprising:
determining, based on the speed of the fluid at each target texture pixel, a divergence of the speed of the fluid at the target texture pixel;
determining a pressure of the fluid at the target texture pixel based on the divergence of the speed of the fluid at the target texture pixel and a pressure of the fluid at each adjacent target texture pixel of the target texture pixel; and
updating the speed of the fluid at the target texture pixel based on the pressure of the fluid at the target texture pixel and the first speed.

5. The dynamic fluid display method according to claim 4, wherein said updating the speed of the fluid at the target texture pixel based on the pressure of the fluid at the target texture pixel and the first speed comprises:
obtaining a gradient of the pressure of the fluid at the target texture pixel;
obtaining a difference between the first speed and the gradient of the pressure, and determining the difference as a second speed of the fluid at the target texture pixel.

6. The dynamic fluid display method according to claim 5, wherein said determining the color at the first texture pixel position at the current time point as the color of the fluid at the target texture pixel at the next time point comprises:

determining the second speed at the first texture pixel position at the current time point as a speed of the fluid at the target texture pixel at the next time point; and determining the color of the fluid at the target texture pixel at the next time point based on the speed of the fluid at the target texture pixel at the next time point.

7. The dynamic fluid display method according to claim 3, further comprising:

storing, via a Graphics Processing Unit (GPU), a speed and a pressure of the fluid at each texture pixel.

8. The dynamic fluid display method according to claim 1, wherein said determining each target texture pixel corresponding to the processing instruction comprises:

determining each target texture pixel corresponding to the processing instruction based on a position or a movement trajectory of a target object.

9. The dynamic fluid display method according to claim 8, wherein the target object comprises a touch operation object or a target object displayed in a video.

10. An electronic device, comprising:

one or more processors; and a memory having one or more applications stored thereon, wherein the one or more applications, when executed by the one or more processors, cause the electronic device to perform a dynamic fluid display method comprising:

displaying a fluid on a user display interface;

obtaining a color corresponding to each texture pixel that corresponds to the fluid;

determining, in response to a processing instruction for the fluid, each target texture pixel corresponding to the processing instruction; and adjusting a color of the fluid at each target texture pixel based on the processing instruction, wherein said adjusting the color of the fluid at each target texture pixel based on the processing instruction comprises:

determining a speed of the fluid at each target texture pixel based on the processing instruction; and adjusting, based on the speed of the fluid at each target texture pixel, the color of the fluid at the target texture pixel, wherein the method further comprises:

obtaining a time stepsize for updating the speed;

determining a first texture pixel position at a current time point based on the time stepsize, a speed corresponding to the fluid at the target texture pixel at the current time point, and a position of the target texture pixel at the current time point; and determining a color at the first texture pixel position at the current time point as a color of the fluid at the target texture pixel at a next time point.

11. The electronic device according to claim 10, where the method further comprises:

determining the speed of the fluid at each target texture pixel in conjunction with an effect of gravity and based on the processing instruction.

12. The electronic device according to claim 11, wherein the method further comprises:

determining, based on the speed of the fluid at each target texture pixel, a curl of the speed of the fluid at the target texture pixel; and updating, based on the curl of the speed of the fluid at each target texture pixel, the speed of the fluid at the target texture pixel to a first speed.

13. The electronic device according to claim 12, wherein the method further comprises:

determining, based on the speed of the fluid at each target texture pixel, a divergence of the speed of the fluid at the target texture pixel;

determining a pressure of the fluid at the target texture pixel based on the divergence of the speed of the fluid at the target texture pixel and a pressure of the fluid at each adjacent target texture pixel of the target texture pixel; and updating the speed of the fluid at the target texture pixel based on the pressure of the fluid at the target texture pixel and the first speed.

14. The electronic device according to claim 13, wherein said updating the speed of the fluid at the target texture pixel based on the pressure of the fluid at the target texture pixel and the first speed comprises:

obtaining a gradient of the pressure of the fluid at the target texture pixel;

obtaining a difference between the first speed and the gradient of the pressure, and determining the difference as a second speed of the fluid at the target texture pixel.

15. The electronic device according to claim 14, wherein said determining the color at the first texture pixel position at the current time point as the color of the fluid at the target texture pixel at the next time point comprises:

determining the second speed at the first texture pixel position at the current time point as a speed of the fluid at the target texture pixel at the next time point; and determining the color of the fluid at the target texture pixel at the next time point based on the speed of the fluid at the target texture pixel at the next time point.

16. A non-transitory computer-readable medium, having computer instructions stored thereon, wherein the computer instructions, when executed by a computer, cause the computer to perform the dynamic fluid display method according to claim 1.

* * * * *